US009475486B2

(12) United States Patent
Tamagawa

(10) Patent No.: US 9,475,486 B2
(45) Date of Patent: *Oct. 25, 2016

(54) CONTROLLER FOR HYBRID VEHICLE

(71) Applicant: HONDA MOTOR CO., LTD., Tokyo (JP)

(72) Inventor: Yutaka Tamagawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/332,172

(22) Filed: Jul. 15, 2014

(65) Prior Publication Data

US 2014/0330467 A1   Nov. 6, 2014

Related U.S. Application Data

(63) Continuation of application No. 13/514,231, filed as application No. PCT/JP2010/073048 on Dec. 21, 2010, now Pat. No. 8,818,595.

(30) Foreign Application Priority Data

Dec. 22, 2009  (JP) ................. 2009-291014

(51) Int. Cl.
*B60L 11/00* (2006.01)
*B60W 10/00* (2006.01)
(Continued)

(52) U.S. Cl.
CPC ............. *B60W 20/20* (2013.01); *B60K 6/442* (2013.01); *B60L 1/14* (2013.01); *B60L 11/12* (2013.01); *B60L 11/1861* (2013.01);
(Continued)

(58) Field of Classification Search
USPC ........................................ 701/22; 180/65.285
See application file for complete search history.

(56) References Cited

U.S. PATENT DOCUMENTS 4,938,102 A   7/1990   Leising et al.
4,982,620 A   1/1991   Holbrook et al.
(Continued)

FOREIGN PATENT DOCUMENTS

CN   1421336 A   6/2003
CN   1584850 A   2/2005
(Continued)

OTHER PUBLICATIONS

U.S. Appl. No. 13/513,515, filed Jun. 1, 2012, Yutaka Tamagawa.
(Continued)

*Primary Examiner* — Yonel Beaulieu
(74) *Attorney, Agent, or Firm* — Westerman, Hattori, Daniels & Adrian, LLP

(57) ABSTRACT

There is provided a controller for a hybrid vehicle which can improve fuel consumption performance and driveability. A controller for a hybrid vehicle which can run in an EV drive mode in which an electric motor 101 is driven by electric power of a battery 113 only and a series drive mode in which the electric motor 101 is driven by electric power generated by a generator 107 using power of an engine 109 includes a demanded driving force calculation unit, a demanded electric power calculation unit, an available uppermost outputting value setting unit, and an engine starting determination unit. The engine starting determination unit starts the engine 109 so that the vehicle runs in the series drive mode when the demanded electric power demanded of the electric motor 101 exceeds the available uppermost outputting value.

11 Claims, 12 Drawing Sheets

(51) Int. Cl.

| | | |
|---|---|---|
| B60W 20/00 | (2016.01) | |
| B60K 6/442 | (2007.10) | |
| B60L 1/14 | (2006.01) | |
| B60W 10/02 | (2006.01) | |
| B60W 10/06 | (2006.01) | |
| B60W 10/08 | (2006.01) | |
| F02D 11/10 | (2006.01) | |
| F02D 29/02 | (2006.01) | |
| F02N 11/08 | (2006.01) | |
| B60W 30/192 | (2012.01) | |
| B60L 11/12 | (2006.01) | |
| B60L 11/18 | (2006.01) | |
| F02D 41/14 | (2006.01) | |

(52) U.S. Cl.
CPC ............ *B60W 10/02* (2013.01); *B60W 10/06* (2013.01); *B60W 10/08* (2013.01); *B60W 20/00* (2013.01); *B60W 20/40* (2013.01); *B60W 30/192* (2013.01); *F02D 11/105* (2013.01); *F02D 29/02* (2013.01); *F02N 11/0818* (2013.01); *B60L 2240/12* (2013.01); *B60L 2240/423* (2013.01); *B60L 2240/545* (2013.01); *B60L 2250/26* (2013.01); *B60W 2510/081* (2013.01); *B60W 2510/244* (2013.01); *B60W 2510/246* (2013.01); *B60W 2520/10* (2013.01); *B60W 2540/10* (2013.01); *B60W 2710/246* (2013.01); *F02D 41/1404* (2013.01); *F02N 11/084* (2013.01); *F02N 2200/061* (2013.01); *F02N 2200/0806* (2013.01); *F02N 2300/20* (2013.01); *Y02T 10/48* (2013.01); *Y02T 10/6234* (2013.01); *Y02T 10/6286* (2013.01); *Y02T 10/642* (2013.01); *Y02T 10/7005* (2013.01); *Y02T 10/705* (2013.01); *Y02T 10/7022* (2013.01); *Y02T 10/7044* (2013.01); *Y02T 10/7077* (2013.01)

(56) References Cited

U.S. PATENT DOCUMENTS

| | | | |
|---|---|---|---|
| 5,211,080 A | 5/1993 | Leising et al. | |
| 5,495,906 A | 3/1996 | Furutani | |
| 5,993,351 A | 11/1999 | Deguchi et al. | |
| 6,083,138 A | 7/2000 | Aoyama et al. | |
| 6,083,139 A | 7/2000 | Deguchi et al. | |
| 6,175,785 B1 | 1/2001 | Fujisawa | |
| 6,190,282 B1 | 2/2001 | Deguchi et al. | |
| 6,203,468 B1 | 3/2001 | Nitta et al. | |
| 6,233,508 B1 | 5/2001 | Deguchi et al. | |
| 6,253,127 B1 | 6/2001 | Itoyama et al. | |
| 6,296,593 B1 | 10/2001 | Gotou et al. | |
| 6,380,640 B1 | 4/2002 | Kanamori et al. | |
| 6,566,826 B2 | 5/2003 | Imai et al. | |
| 7,279,855 B2 | 10/2007 | Tahara et al. | |
| 7,576,501 B2 | 8/2009 | Okubo et al. | |
| 7,819,212 B2 | 10/2010 | Kawasaki | |
| 8,571,734 B2 | 10/2013 | Yamamoto et al. | |
| 8,571,737 B2* | 10/2013 | Tamagawa | 701/22 |
| 8,761,986 B2* | 6/2014 | Tamagawa | 701/22 |
| 8,818,595 B2* | 8/2014 | Tamagawa | 701/22 |
| 2002/0024306 A1 | 2/2002 | Imai et al. | |
| 2003/0102175 A1 | 6/2003 | Wakashiro et al. | |
| 2003/0173123 A1 | 9/2003 | Nakanowatari | |
| 2004/0006414 A1 | 1/2004 | Suzuki | |
| 2006/0152180 A1 | 7/2006 | Tahara et al. | |
| 2006/0272869 A1 | 12/2006 | Hidaka et al. | |
| 2007/0255477 A1 | 11/2007 | Okuda et al. | |
| 2007/0275819 A1 | 11/2007 | Hirata | |
| 2008/0091314 A1 | 4/2008 | Hayashi et al. | |
| 2008/0215201 A1 | 9/2008 | Okubo et al. | |
| 2009/0118949 A1 | 5/2009 | Heap et al. | |
| 2009/0143189 A1 | 6/2009 | Hasegawa et al. | |
| 2009/0171523 A1 | 7/2009 | Luo et al. | |
| 2009/0200095 A1 | 8/2009 | Kawasaki | |
| 2009/0236159 A1 | 9/2009 | Shibata et al. | |
| 2009/0250278 A1 | 10/2009 | Kawasaki et al. | |
| 2009/0314565 A1 | 12/2009 | Suzuki | |
| 2010/0075798 A1 | 3/2010 | Suzuki et al. | |
| 2010/0198439 A1 | 8/2010 | Ishii | |
| 2010/0204862 A1 | 8/2010 | Uejima et al. | |
| 2010/0258366 A1 | 10/2010 | Kim | |
| 2010/0323844 A1 | 12/2010 | Okubo et al. | |
| 2011/0015811 A1 | 1/2011 | Okubo et al. | |
| 2011/0022260 A1 | 1/2011 | Ichikawa | |
| 2011/0313602 A1 | 12/2011 | Hirata et al. | |
| 2012/0116629 A1 | 5/2012 | Kamoshida | |
| 2012/0245783 A1 | 9/2012 | Tamagawa | |
| 2012/0245785 A1 | 9/2012 | Tamagawa | |
| 2012/0259496 A1 | 10/2012 | Ikegami | |
| 2013/0103242 A1 | 4/2013 | Takeuchi et al. | |

FOREIGN PATENT DOCUMENTS

| | | |
|---|---|---|
| CN | 1684850 A | 10/2005 |
| CN | 101428614 A | 5/2009 |
| CN | 101445039 A | 6/2009 |
| EP | 0950557 B1 | 9/2004 |
| EP | 1 731 802 A2 | 12/2006 |
| JP | 08-098322 | 4/1996 |
| JP | 09-224304 A | 8/1997 |
| JP | 11-089007 A | 3/1999 |
| JP | 11-122824 A | 4/1999 |
| JP | 11-165566 A | 6/1999 |
| JP | 11-178110 A | 7/1999 |
| JP | 2000-023311 A | 1/2000 |
| JP | 3052753 B2 | 4/2000 |
| JP | 2000-136835 A | 5/2000 |
| JP | 2000-236601 A | 8/2000 |
| JP | 2002-238104 A | 8/2002 |
| JP | 2003-237392 A | 8/2003 |
| JP | 2003-269208 A | 9/2003 |
| JP | 2006-020401 A | 1/2006 |
| JP | 2006-335196 A | 12/2006 |
| JP | 2007-022118 A | 2/2007 |
| JP | 2007-118722 A | 5/2007 |
| JP | 2007-314097 A | 12/2007 |
| JP | 2008-87703 A | 4/2008 |
| JP | 2009/006829 A | 1/2009 |
| JP | 2009/274566 A | 11/2009 |
| JP | 2009-280082 A | 12/2009 |
| JP | 2009-292287 A | 12/2009 |
| JP | 2010-125956 A | 6/2010 |
| WO | 2011/074482 A1 | 6/2011 |
| WO | WO 2011078169 A1 | 6/2011 |

OTHER PUBLICATIONS

U.S. Appl. No. 13/514,231, filed Jun. 6, 2012, Yutaka Tamagawa.
U.S. Appl. No. 13/514,582, filed Jun. 7, 2012, Yutaka Tamagawa.
U.S. Appl. No. 14/037,019, filed Sep. 25, 2013, Yutaka Tamagawa.
U.S. Appl. 14/278,016, filed May 15, 2014, Yutaka Tamagawa.
U.S. Notice of Allowance dated Apr. 15, 2014, issued in related U.S. Appl. No. 13/514,231 (7 pages).
U.S. Notice of Allowance dated Jun. 25, 2013, issued in related U.S. Appl. No. 13/514,582 (9 pages).
U.S. Notice of Allowance dated Feb. 14, 2014, issued in related U.S. Appl. No. 14/037,019 (8 pages).
International Search Report dated Mar. 1, 2011, issued in related PCT/JP2010/073048 (2 pages).
U.S. Quayle Action dated Nov. 25, 2013, issued in related U.S. Appl. No. 14/037,019 (7 pages).
U.S. Office Action dated Dec. 13, 2013, issued in related U.S. Appl. No. 13/514,231 (7 pages).
International Search Report dated Jan. 11, 2011, issued in related PCT/JP2010/072178 (1 page).
International Search Report dated Jan. 11, 2011, issued in related PCT/JP2010/072177 (1 page).

(56) References Cited

OTHER PUBLICATIONS

U.S. Office Action dated Oct. 6, 2014, issued in related U.S. Appl. No. 13/513,515 (15 pages).
Extended European Search Report dated Sep. 25, 2014, issued in the corresponding European patent application No. 10839419.8 (6 pages).
U.S. Office Action dated Nov. 14, 2014, issued in related U.S. Appl. No. 14/278,016 (17 pages).
U.S. Office Action dated Jan. 28, 2014, issued in related U.S. Appl. No. 13/513,515 (13 pages).
U.S. Office Action dated Jul. 31, 2013, issued in related U.S. Appl. No. 13/513,515 (11 pages).
Notice of Allowance dated Feb. 3, 2016, issued in co-pending U.S. Appl. No. 13/513,515.
Notice to file corrected application papers dated Feb. 26, 2016, issued in co-pending U.S. Appl. No. 13/513,515.
US Final Office Action dated Mar. 12, 2015, issued in co-pending U.S. Appl. No. 13/513,515. (29 pages).
Office Action dated May 12, 2015, issued in Japanese Patent Application No. 2014-081781 (2 pages).
Chinese Office Action dated May 23, 2014, corresponding to Chinese Patent Application No. 201080053021.
Chinese Office Action, Chinese Patent Application No. 201080054900.4 issued Apr. 10, 2014.
Russian Office Action dated Feb. 13, 2014; Russian Application No. 2012127408/11(042607).
Office Action dated Jul. 21, 2015, issued in counterpart Japanese Patent Application No. 2014-131628 (4 pages).
Office Action dated Jul. 14, 2015, issued in counterpart Japanese Patent Application No. 2014-131627 (4 pages).
U.S. Non-Final Office Action dated Sep. 10, 2015, issued in U.S. Appl. No. 13/513,515. (18 pages).
Chinese Office Action dated Jan. 6, 2016, issued in Chinese Patent Application No. 201410331310.1.
Office Action dated Aug. 3, 2016, issued in counterpart Chinese Patent Application No. 201510088769.8 (5 pages).

\* cited by examiner

CONTROLLER FOR HYBRID VEHICLE

CROSS-REFERENCE TO RELATED APPLICATION

This application is a Continuation of U.S. Pat. No. 8,818, 595, which is a National Stage entry of International Application No. PCT/JP2010/073048, filed Dec. 21, 2010, which claims priority to Japanese Patent Application No. 2009-291014, filed Dec. 22, 2009. The disclosures of the prior applications are incorporated in their entirety by reference.

TECHNICAL FIELD

The present invention relates to a controller for a hybrid vehicle.

BACKGROUND ART

A hybrid vehicle can run on plural energy sources such as electric power and fuel and also can run on various drive modes depending upon energy sources used. As drive modes of a hybrid vehicle, there are, for example, an EV drive mode in which the hybrid vehicle runs by driving an electric motor by electric power of a battery only, a series drive mode in which the hybrid vehicle runs by driving the electric motor by electric power generated by a generator using power of an engine and an engine drive mode in which the hybrid vehicle runs by driving directly drive wheels by the engine. For example, Patent Literature 1 describes a hybrid vehicle which changes drive modes based on demanded torque which is necessary for propulsion of the vehicle.

RELATED ART LITERATURE

Patent Literature

Patent Literature 1: JP-H09-224304-A

OUTLINE OF THE INVENTION

Problems to be Solved by the Invention

In the hybrid vehicle described in Patent Literature 1, as the torque requirement increases, the drive modes are changed from a drive by the electric motor alone (the EV drive mode) to a drive by the engine alone (the engine drive mode). When drive wheels are directly driven by the engine, however, a gear ratio to be set is limited, and therefore, there may be a situation in which it is difficult to run the engine at an operation point which provides good fuel economy. In view of these facts, it is desirable that the drive mode is changed from the EV drive mode to the series drive mode in which the operation point can freely be set.

Additionally, when the drive modes are changed over based on the demanded torque which is necessary for propulsion of the vehicle, the vehicle runs in the EV drive mode although a battery cannot output demanded electric power which corresponds to the demanded torque depending upon conditions such as the state-of-charge (SOC) and temperature of the battery. Therefore, there are fears that the driveability is deteriorated. In addition, as this occurs, there are fears that the battery is discharged excessively.

The invention has been made in view of the problems, and an object thereof is to provide a controller for a hybrid vehicle which can improve the fuel economy and the driveability of the hybrid vehicle.

Means for Solving the Problems

According to a first aspect, a controller for a hybrid vehicle includes an engine (e.g., an engine 109 in embodiment), an electric motor (e.g., an electric motor 101 in embodiment), a generator (e.g., a generator 107 in embodiment) for generating electric power by power of the engine, and a battery (e.g., a battery 113 in embodiment) for storing electric power generated by the electric motor or the generator and supplying the electric power to the electric motor, the vehicle being able to run in an EV drive mode in which the electric motor is driven by electric power of the battery only and a series drive mode in which the electric motor is driven by electric power generated by the generator using power of the engine, the controller including a demanded driving force calculation unit (e.g., a management ECU 119 in embodiment) for calculating a demanded driving force for the electric motor based on vehicle speed and accelerator pedal opening, a demanded electric power calculation unit (e.g., the management ECU 119 in embodiment) for calculating a demanded electric power based on the demanded driving force and a revolution speed of the electric motor, an available uppermost outputting value setting unit (e.g., the management ECU 119 in embodiment) for setting an available uppermost outputting value (e.g., an available uppermost outputting value $P_U$ in embodiment) for the battery based on the conditions of the battery, and an engine starting determination unit (e.g., the management ECU 119 in embodiment) for determining on the starting of the engine based on the demanded electric power, wherein the engine starting determination unit starts the engine so that the vehicle runs in the series drive mode when the demanded electric power exceeds the available uppermost outputting value.

According to a further aspect, the controller includes, wherein the series drive mode includes a battery input/output zero mode in which only electric power corresponding to the demanded electric power is generated by the generator for supply to the electric motor, wherein the controller further includes a set value setting unit (e.g., the management ECU 119 in embodiment) for setting a set value (e.g., a fuel-consumption-reducing output upper limit value $P_L$ in embodiment) based on the conditions of the battery, wherein the set value is a smaller value than the available uppermost outputting value and is an upper limit value for an output which satisfies {(Loss generated when running in EV drive mode)+(Loss generated when generating electric power corresponding to electric power consumed in EV drive mode)}<(Loss generated in battery input/output zero mode), and wherein the engine starting determination unit starts the engine in accordance with the running conditions of the vehicle so as to cause the vehicle to run in the series drive mode when the demanded electric power is equal to or larger than the set value and is equal to or smaller than the available uppermost outputting value.

According to another aspect, the controller includes, wherein the available uppermost outputting value and the set value are set based on the state-of-charge of the battery or the temperature of the battery.

According to yet another aspect, the controller includes, wherein the available uppermost outputting value and the set value are set based on a smaller value of values which are calculated based on the state-of-charge of the battery and the temperature of the battery.

According to a further aspect, the controller includes, wherein the available uppermost outputting value and the set value are set smaller as the state-of-charge of the battery becomes smaller.

According to another aspect, the controller includes, wherein the available uppermost outputting value and the set value are set smaller as the temperature of the battery becomes smaller.

According to a further aspect, the controller includes a first fitness calculation unit (e.g., the management ECU 119 in embodiment) for calculating a first fitness between the available uppermost outputting value and the set value by executing a fuzzy reasoning from a first membership function which is set with respect to demanded electric power, a second fitness calculation unit (e.g., the management ECU 119 in embodiment) for calculating a second fitness by executing a fuzzy reasoning from a second membership function which is set with respect to variation in accelerator pedal opening, and a degree-of-start-demand calculation unit (e.g., the management ECU 119 in embodiment) for calculating a degree of start demand for the engine based on the first fitness and the second fitness, wherein the engine starting determination unit starts the engine and causes the vehicle to run in the series drive mode when an integral value obtained by integrating the degree of start demand surpasses a predetermined value, with the demanded electric power being equal to or larger than the set value and being equal to or smaller than the available uppermost outputting value.

According to an additional aspect, the controller includes, wherein the first membership function is corrected in accordance with the temperature of a coolant of the engine.

According to another aspect, the controller includes, wherein the first membership function is corrected in accordance with energy which is consumed by an auxiliary (e.g., an auxiliary 117 in embodiment).

According to yet another aspect, the controller includes an intention-to-accelerate determination unit (e.g., the management ECU 119 in embodiment) for determining on a driver's intention to accelerate, wherein the second membership function is positively corrected when the intention-to-accelerate determination unit determines that the driver's intention to accelerate is high, whereas the second membership function is corrected negatively when the intention-to-accelerate determination unit determines that the driver's intention to accelerate is low.

According to another aspect, the controller includes, wherein the vehicle can run in an engine drive mode in which drive wheels are driven by power of the engine by engaging a clutch (e.g., a clutch 115 in embodiment) which is provided between the engine and the electric motor, wherein the controller further includes a clutch engaging/disengaging unit (e.g., the management ECU 119 in embodiment) for engaging and disengaging the clutch, and wherein the clutch engaging/disengaging unit engages the clutch to change the drive modes from the series drive mode to the engine drive mode when a loss generated in the series drive mode is larger than a loss generated in the engine drive mode.

Advantages of the Invention

According to Claim 1, the engine is started when the demanded electric power demanded of the electric motor surpasses the available uppermost outputting value which is set in accordance with the conditions of the battery. Consequently, not only can a desired demanded electric power be secured, but also the over change of the battery can be prevented.

According to Claim 2, the set value is set which is the maximum value of the demanded electric power with which the fuel consumption resulting when the vehicle runs in the EV drive mode is improved better than the fuel consumption resulting when the vehicle runs in the battery input/output zero mode, and it is determined based on the set value whether or not the engine is started. Therefore, the fuel consumption can be improved further. In addition, the set value is set based on the conditions of the battery, and therefore, the over charge of the battery can be prevented. In addition, when the demanded electric power demanded of the electric motor is somewhere between the set value and the available uppermost outputting value, it is determined based on the running conditions of the vehicle whether or not the engine is started. Therefore, the engine can be started at suitable timing for the running conditions of the vehicle, thereby making it possible to prevent the performance of unnecessary operations.

According to Claims 3 to 6, it is considered that the electric power that can be outputted is reduced depending upon the SOC and temperature of the battery. Therefore, the demanded electric power can be ensured by starting the engine earlier to generate electric power.

According to Claim 7, it is determined by executing the fuzzy reasoning based on the demanded electric power demanded of the electric motor and the driver's intention to accelerate whether or not the engine is started. Therefore, there is no fear that the lack of driving force is caused by the poor output of the battery, and the unnecessary operation of the engine is obviated. Additionally, the continuity of a running condition of the vehicle can be determined by integrating the degree of engine start demand, and therefore, the unnecessary operation of the engine is obviated. By so doing, a more accurate control reflecting the intention of the driver can be performed.

According to Claim 8, the temperature of the coolant of the engine is taken into consideration, and therefore, the determination on whether or not the engine is started can be made in accordance with the temperature of the coolant of the engine, thereby making it possible to prevent the unnecessary operation of the engine.

According to Claim 9, the consumed energy by the auxiliary is taken into consideration, and therefore, the demanded electric power can be ensured by starting the engine earlier to generate electric power, thereby making it possible to prevent the over charge of the battery.

According to Claim 10, the intention of the driver is taken into consideration, and therefore, not only can the drivability be improved, but also the fuel consumption can be improved further.

According to Claim 11, the drive mode can quickly be changed from the series drive mode to the engine drive mode when the loss in the engine drive mode is determined to be less, and therefore, the fuel consumption can be improved further.

MODE FOR CARRYING OUT THE INVENTION

Figure 1:
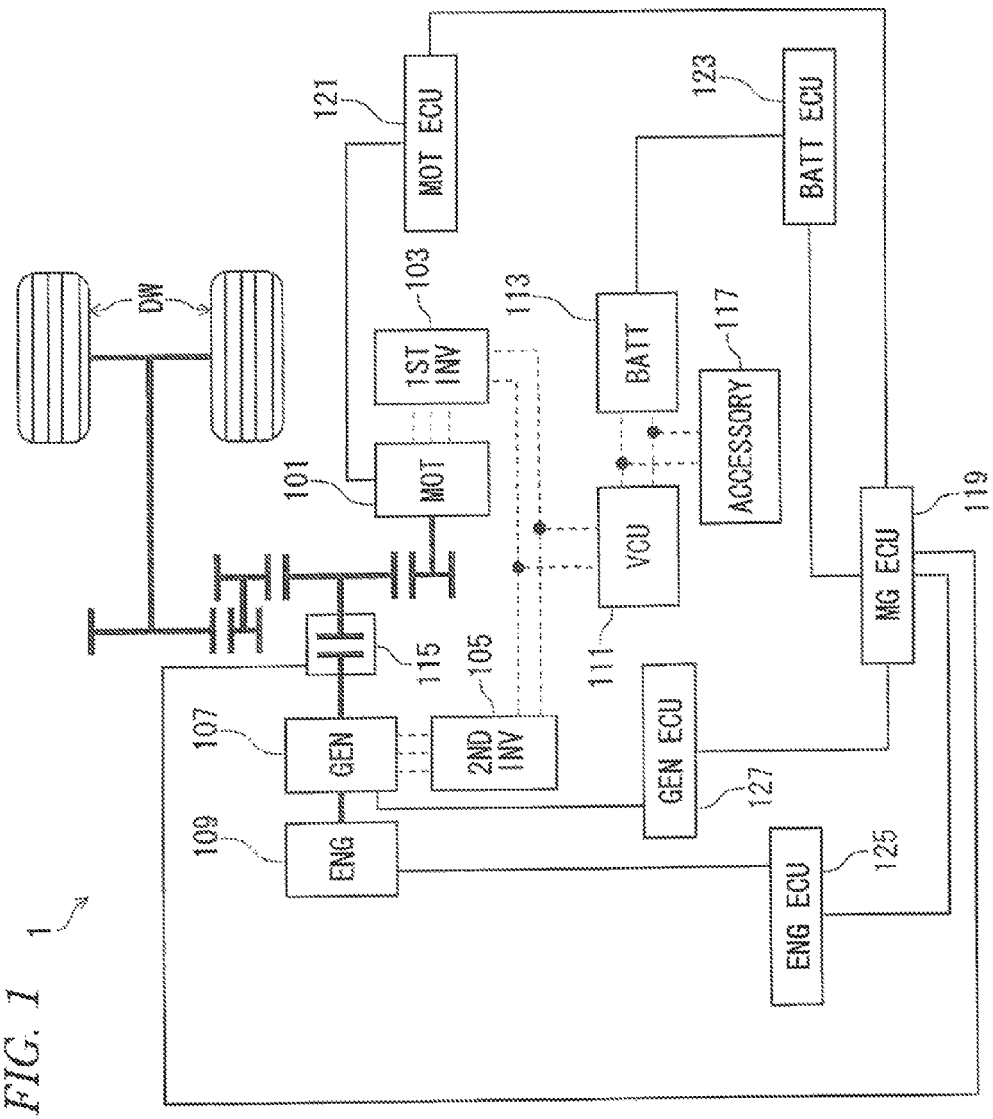
FIG. 1 shows a hybrid vehicle which utilizes a controller of an embodiment.

Hereinafter, an embodiment of the invention will be described by reference to the accompanying drawings. Note that the drawings are to be seen in a direction in which reference numerals look properly.

An HEV (Hybrid Electrical Vehicle) includes an electric motor and an engine and runs by driving force of the electric motor or the engine depending upon the running conditions of the vehicle. FIG. 1 shows an internal configuration of an HEV (hereinafter, referred to simply as a "vehicle") of the embodiment. As shown in FIG. 1, the vehicle 1 of the embodiment includes left and right drive wheels DW, DW, an electric motor (MOT) 101, a first inverter ($1^{st}$ INV) 103, a second inverter ($2^{nd}$ INV) 105, a generator (GEN) 107, an engine (ENG) 109, a bidirectional voltage converter (VCU) (hereinafter, referred to simply as a "converter") 111, a battery (BATT) 113, a lockup clutch (hereinafter, referred to simply as a "clutch") 115, an auxiliary (ACCESSORY) 117, a management ECU (MG ECU) 119, a motor ECU (MOT ECU) 121, a battery ECU (BATT ECU) 123, an engine ECU (ENG ECU) 125, and a generator ECU (GEN ECU) 127.

The electric motor 101 is, for example, a three-phase alternating current motor. The electric motor 101 generates power (torque) necessary to run the vehicle. Torque generated in the electric motor 101 is transmitted to the drive wheels DW, DW. When a driving force is transmitted to the electric motor 101 side from the drive wheels DW, DW via drive shafts at the time of deceleration of the vehicle, the electric motor 101 functions as a generator to generate a so-called regenerative braking force and recovers the kinetic energy of the vehicle as electric energy (regenerative energy) to thereby charge the battery 113. The motor ECU 121 controls the operation and conditions of the electric motor 101 in response to an instruction from the management ECU 119.

The multi-cylinder internal combustion engine (hereinafter, referred to simply as the "engine") 109 drives the generator 107 to generate electric power by the power of the engine 109 with the clutch 115 disengaged. The engine 109 generates power (torque) necessary to run the vehicle with the clutch 115 engaged. With the clutch 115 engaged, the torque generated in the engine 109 is transmitted to the drive wheels DW, DW via the generator 107 and the clutch 115. The engine ECU 125 controls the start and stop and revolution speed of the engine 109 in response to an instruction from the management ECU 119.

The generator 107 is driven to generate electric power by the engine 109. An alternating current voltage generated in the generator 107 is converted into a direct current voltage by the second inverter 105. The direct current voltage converted by the second inverter 105 is dropped by the converter 111 and is then stored in the battery 113 or is converted into an alternating current voltage via the first inverter 103 to thereafter be supplied to the electric motor 101. The generator ECU 127 controls the revolution speed of the generator 107 and the amount of electric power generated by the generator 107 in response to an instruction from the management ECU 119.

The battery 113 has plural battery cells which are connected in series and supplies a high voltage of 100 to 200V, for example. The voltage of the battery 113 is increased by the convener 111 and is supplied to the first inverter 103. The first inverter 103 converts the direct current voltage from the battery 113 into an alternating current voltage and supplies a three-phase current to the electric motor 101. Information on the SOC and temperature of the battery 113 is inputted into the battery ECU 123 from sensors, not shown. These pieces of information are sent to the management ECU 119.

The clutch 115 cuts off or connects (cuts off/connects) a driving force transmission line from the engine 109 to the drive wheels DW, DW based on an instruction from the management ECU 119. With the clutch 115 engaged, the driving force from the engine 109 is not transmitted to the drive wheels DW, DW, whereas with the clutch 115 engaged, the driving force from the engine 109 is transmitted to the drive wheels DW, DW.

The auxiliary 117 includes, for example, a compressor of an air conditioner for controlling the temperature in a passenger compartment, audio equipment and lamps and operates on electric power supplied from the battery 113. The consumed energy by the auxiliary 117 is monitored by a sensor, not shown, and information on the consumed energy is then sent to the management ECU 119.

The management ECU 119 switches the driving force transmission systems and controls and monitors the driving of the electric motor 101, the first inverter 103, the second inverter 105, the engine 109, and the auxiliary 117. In addition, vehicle speed information from a vehicle speed sensor, not shown, accelerator pedal opening (AP opening) information of an accelerator pedal, not shown, brake pedal effort information of a brake pedal, not shown, and shift range information and information from an eco-switch are inputted into the management ECU 119. The management ECU 119 instructs the motor ECU 121, the battery ECU 123, the engine ECU 125 and the generator ECU 127.

The vehicle 1 which is configured in this way can run in various drive modes based on different drive sources such as, for example, an "EV drive mode," a "series drive mode," and an "engine drive mode" in accordance with the running conditions of the vehicle. Hereinafter, the respective drive modes in which the vehicle 1 can run will be described.

In the EV drive mode, the electric motor 101 is driven by only electric power from the battery 113 to thereby drive the drive wheels DW, DW, whereby the vehicle 1 is driven. As this occurs, the engine 109 is not driven, and the clutch 115 is disengaged.

In the series drive mode, the generator 107 generates electric power by power from the engine 109, and the electric motor 101 is driven by the electric power generated by the generator 107 to drive the drive wheels DW, DW, whereby the vehicle 1 is driven. As this occurs, the clutch 115 is disengaged. This series drive mode includes a "battery input/output zero mode," a "charging-upon-driven mode," and an "assist mode."

In the battery input/output zero mode, electric power generated in the generator 107 using the power of the engine 109 is supplied directly to the electric motor 101 via the second inverter 105 and the first inverter 103 to drive the electric motor 101, whereby the drive wheels DW, DW are driven to thereby drive the vehicle 1. Namely, the generator 107 generates only electric power which corresponds to a demanded electric power, and substantially, no electric power is inputted into or outputted from the battery 113.

In the charging-upon-driven mode, electric power generated in the generator 107 using the power of the engine 109 is supplied directly to the electric motor 101 to drive the electric motor 101, whereby the drive wheels DW, DW are driven to thereby drive the vehicle 1. At the same time, the electric power generated in the generator 107 using the power of the engine 109 is supplied to the battery 113 to charge the battery 113. Namely, the generator 107 generates electric power more than the demanded electric power demanded of the electric motor 101. Thus, electric power corresponding to the demanded electric power is supplied to the electric motor 101, while residual electric power is supplied to the battery 113 to be stored therein.

In case the demanded electric power demanded of the electric motor 101 surpasses the electric power that can be generated by the generator 107, the vehicle 1 runs in the assist mode. In the assist mode, the electric power generated in the generator 107 using the power of the engine 109 and the electric power from the battery 113 are both supplied to the electric motor 101 to drive the electric motor 101, whereby the drive wheels DW, DW are driven to drive the vehicle 1.

In the engine drive mode, the clutch 115 is engaged in response to an instruction from the management ECU 119, whereby the drive wheels DW, DW are driven directly by the power of the engine 109 to thereby drive the vehicle 1.

Figure 2:
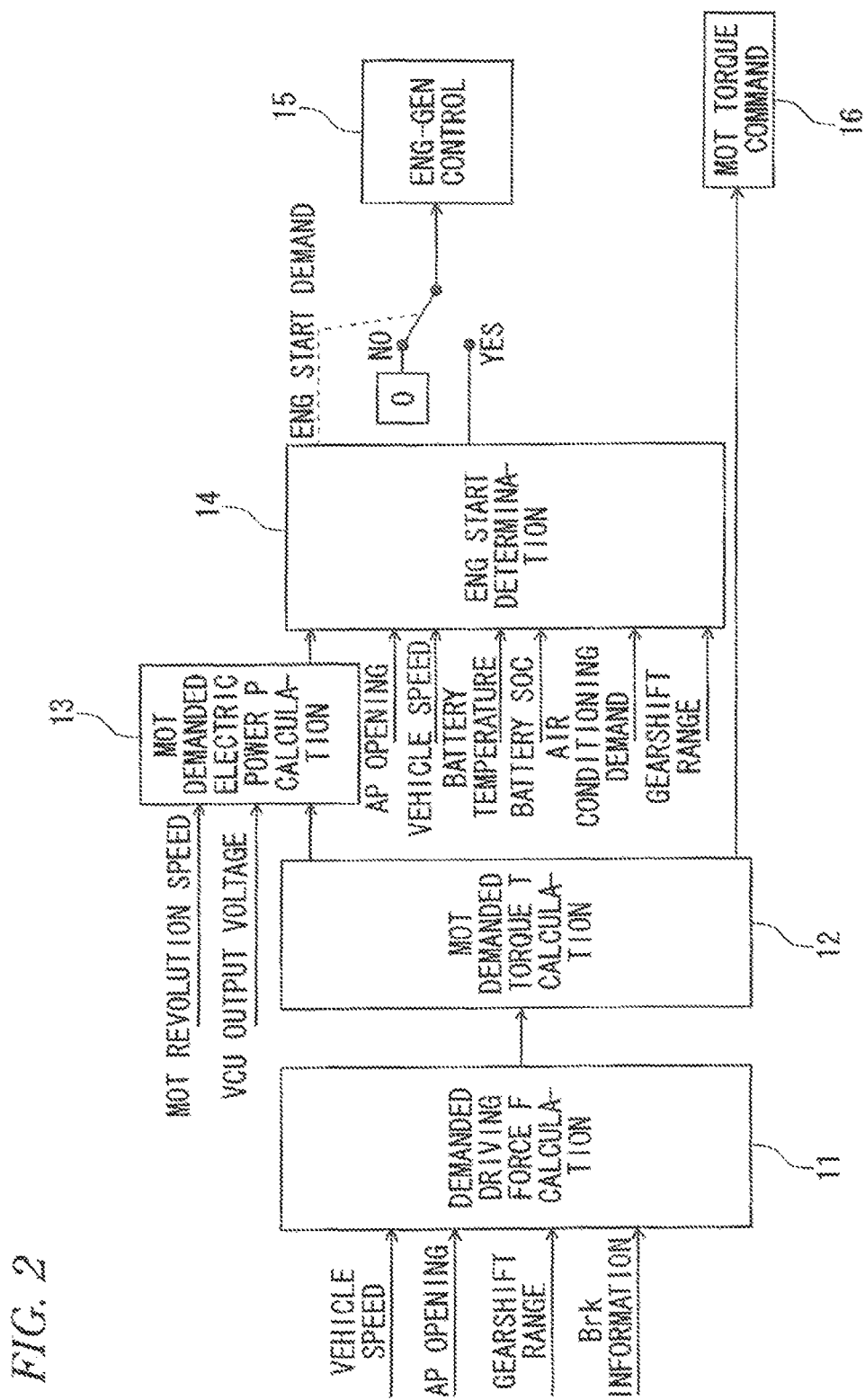
FIG. 2 shows a detailed configuration of the controller for a hybrid vehicle.

In switching these drive modes, a controller for a hybrid vehicle according to the embodiment determines which of the EV drive mode and the series drive mode fits better to the current running condition of the vehicle 1 based on the demanded electric power demanded of the electric motor 101 which corresponds to the demanded driving force demanded of the vehicle 1. Then, in the event that the controller determines that the series drive mode fits better than the EV drive mode, the controller starts the engine 109 and switches the drive mode from the EV drive mode to the series drive mode. Hereinafter, the determination on the start of the engine 109 and the control of switching the drive modes will be described in detail. FIG. 2 shows a detailed configuration of the controller of the hybrid vehicle shown in FIG. 1.

Firstly, the management ECU 119 calculates a demanded driving force F demanded of the electric motor 101 to drive the vehicle based on information on accelerator pedal opening, vehicle speed, gear shifted position, brake pedal effort (a demanded driving force calculation unit 11). Following this, the management ECU 119 calculates a demanded torque T demanded of the electric motor 101 based on a value obtained by passing the demanded driving force F obtained through a low-pass filter (MOT demanded torque calculation unit 12).

Next, the management ECU 119 calculates a demanded electric power P demanded of the electric motor 101 based on the demanded torque T demanded of the electric motor 101, a voltage (a VCU output voltage) which is supplied after having been increased by the converter 111 and the current revolution speed of the electric motor 101 (MOT revolution speed) (an MOT demanded electric power calculation unit 13).

Figure 3:
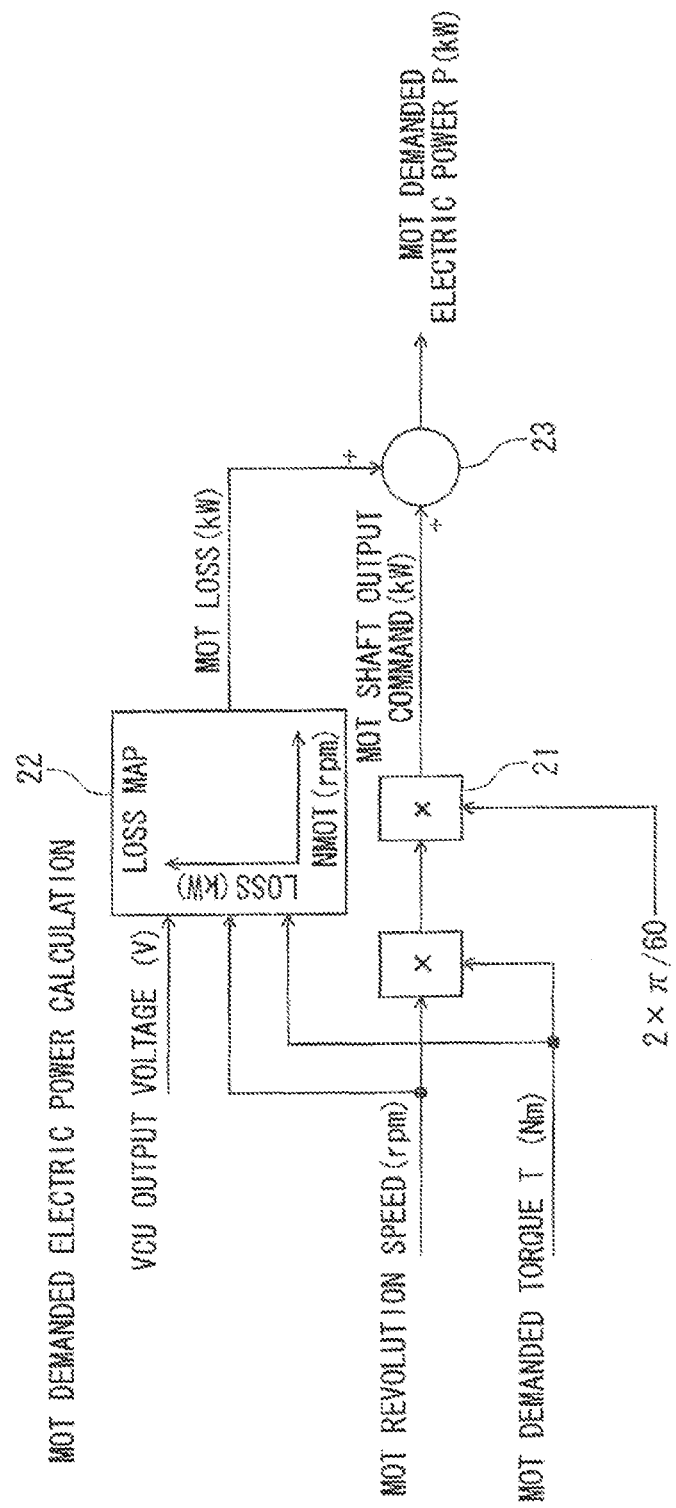
FIG. 3 shows a detailed configuration of an MOT demanded electric power calculation block shown in FIG. 2.

FIG. 3 shows a detailed configuration of the MOT demanded electric power calculation unit 13. In calculating a demanded electric power demanded of the electric motor 101, the management ECU 119 calculates an MOT shaft output command which is an output value to be outputted by the electric motor 101 based on the demanded torque and revolution speed of the electric motor 101 (an MOT shaft output command calculation block 21). The MOT shaft output command is calculated based on the following expression (1).

MOT Shaft Output Command (kW)=MOT Demanded Torque (N)×MOT Revolution Speed (rpm)×2π/60 (1)

In addition, the management ECU 119 calculates a loss generated in the electric motor 101 based on the demanded torque T demanded of the electric motor 101, the revolution speed of the electric motor 101 and the VCU output voltage by retrieving a loss map stored in a memory, not shown (a motor loss calculation block 22). This motor loss includes every loss that is possible to be generated such as switching loss and thermal loss, as well as loss generated in the converter.

Then, the management ECU 119 calculates a demanded electric power P demanded of the electric motor 101 which includes electric power corresponding to the motor loss by adding the motor shaft output command and the motor loss (a demanded electric power calculation block 23).

Returning to FIG. 2, the management ECU 119 determines whether or not the engine 109 is started based on the demanded electric power P demanded of the electric motor 101 calculated (an ENG start determination unit 14). When there is a start demand for the engine 109 (hereinafter, also referred to as an ENG start demand), the management ECU 119 controls the engine 109 and the generator 107 (an ENG-GEN control unit 15).

Figure 4:
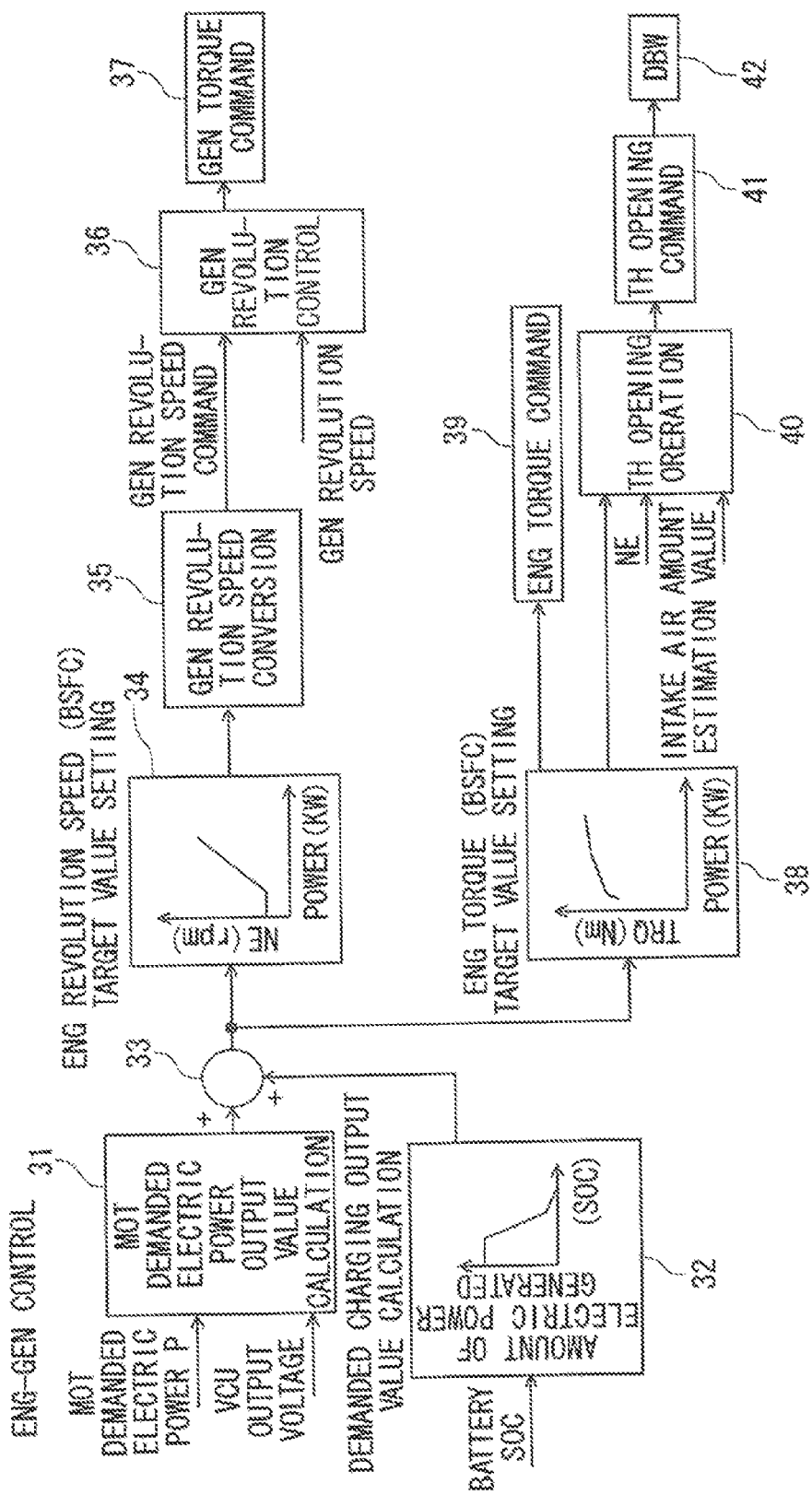
FIG. 4 shows a detailed configuration of an ENG-GEN control block shown in FIG. 2.

FIG. 4 shows a detailed configuration of the ENG-GEN control unit 15. Firstly, the management ECU 119 calculates an MOT demanded electric power generation output value which is an output value of electric power that is to be generated by the generator 107 for supply of electric power corresponding to a demanded electric power demanded of the electric motor 101 based on the demanded electric power P demanded of the electric motor 101 and the voltage (the VCU output voltage) which is increased by the converter 111 for supply (an MOT demanded electric power generation output value calculation block 31).

An SOC to be attained (a target SOC) is set for the battery 113, and it is desirable to charge the battery 113 when the current SOC is lower than the target SOC. Consequently, the management ECU 119 calculates a demanded charging output value which corresponds to a charge capacity that is necessary to reach the target SOC based on the current SOC of the battery 113 (a demanded charging output value calculation block 32). Then, the management ECU 119 calculates a demanded electric power generation output value by adding the MOT demanded electric power generation output value and the demanded charging output value (a demanded electric power generation output value calculation block 33).

The management ECU 119 calculates a revolution speed target value for the engine 109 which corresponds to the demanded electric power generation output value calculated by retrieving a BSFC (Brake Specific Fuel Consumption) map in relation to the revolution speed of the engine 109 based on the demanded electric power generation output value (an ENG revolution speed target value calculation block 34). This ENG revolution speed target value is a revolution speed which provides a best fuel consumption efficiency corresponding to the demanded electric power generation output value. However, in the engine 109, a fuel injection amount is primarily determined according to an intake air amount, and therefore, it is difficult to control so that the revolution speed of the engine 109 coincides with the ENG revolution speed target value. Then, the revolution speed and torque of the generator 107 which is connected with a crankshaft, not shown, of the engine 109 are controlled by the generator ECU 127 so as to control the amount of electric power to be generated by the generator 107 to thereby control the revolution speed of the engine 109. Consequently, the ENG revolution speed target value is converted into the revolution speed of the generator 107 (a GEN revolution speed conversion block 35), the revolution of the generator 107 is controlled (a GEN revolution control block 36), and a GEN torque command is sent to the generator ECU 127 (a GEN torque command block 37).

The management ECU 119 calculates a torque target value for the engine 109 which corresponds to the demanded electric power generation output value by retrieving a BSFC (Brake Specific Fuel Consumption) map in relation to the torque of the engine 109 based on the demanded electric power generation output value calculated (an ENG torque target value calculation block 38). The management ECU 119 sends an ENG torque command to the engine ECU 125 based on this ENG torque target value (a GEN torque command block 39). Then, the management ECU 119 operates a throttle opening based on the torque target value calculated, the current revolution speed of the engine 109 and an intake air amount estimation value based on the torque target value and the current revolution speed (a TH opening operation block 40). The management ECU 119 performs a DBW (Drive By Wire) control based on the throttle opening command calculated (a TH opening command block 41) (a DBW block 42).

Returning to FIG. 2, when no ENG start demand is made by the ENG start determination block 14, the engine 109 is not started, and the electric power in the battery 113 is supplied to the electric motor 101, whereby the vehicle runs in the EV drive mode. Consequently, the engine 109 and the generator 107 are not controlled.

Irrespective of the ENG start demand being made, the management ECU 119 sends a torque command for the electric motor 101 to the motor ECU 121 based on the demanded torque T calculated in the MOT demanded torque calculation block 11 (an MOT torque command unit 16). The motor ECU 121 controls the electric motor 101 based on the MOT torque command.

Figure 5:
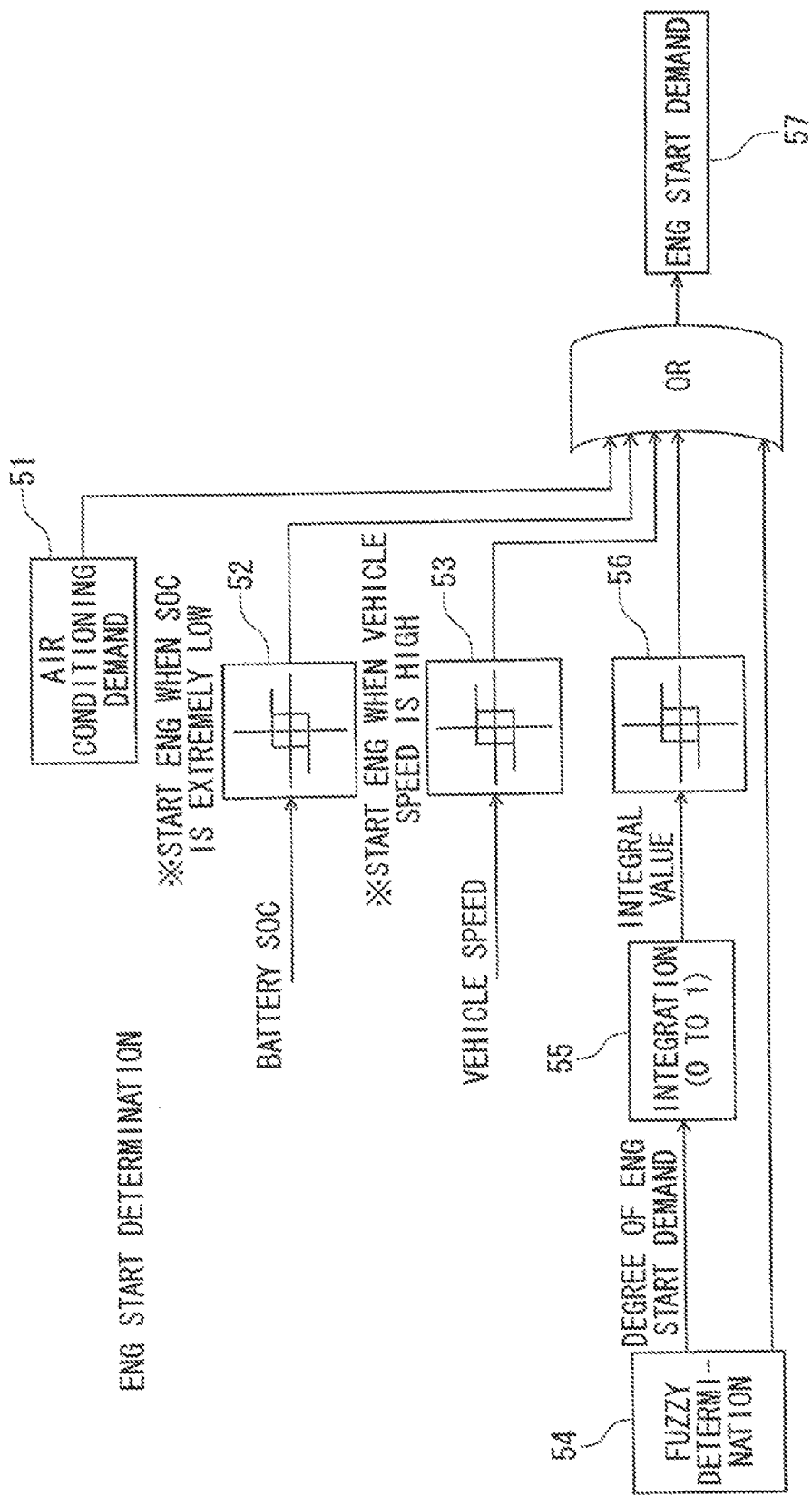
FIG. 5 shows a detailed configuration of an ENG start determination block shown in FIG. 2.

FIG. 5 shows a detailed configuration of the ENG start determination unit 14. Here, the management ECU 119 determines that a start demand for the engine 109 is made when at least one of conditions that will be described later is met (an ENG start demand block 57). Hereinafter, the conditions will be described in detail.

Firstly, when there is made an air conditioning demand such as a demand tor cooling or heating of a passenger compartment, the electric power in the battery 113 is consumed much, and it is highly possible that the engine 109 needs to be started due to head generated by the engine 109 being made use of in heating the passenger compartment. Consequently, when there is made such an air conditioning demand as a demand for cooling or heating the passenger compartment, it is determined that there is made a start demand tor the engine 109 (an air conditioning demand determination block 51).

When the SOC of the battery 113 is extremely low, a sufficient output cannot be obtained from the battery 113, and hence, it is difficult that the vehicle runs in the EV drive mode. Thus, it is highly possible that the engine 109 is driven to charge the battery 113. Consequently, when the SOC of the battery 113 is lower than a predetermined threshold Sth, it is determined that there is made a start demand for the engine 109 (a low SOC determination block 52). In this case, in order to prevent the frequent occurrence of start and stop of the engine 109, the determination is made based on a threshold having a constant hysteresis width.

Additionally, when the vehicle is running at a high speed which is equal to or faster than a predetermined speed, the demanded driving force demanded of the vehicle is high, and it is difficult that the vehicle runs in the EV drive mode. Thus, it is highly possible that the vehicle runs in the series drive mode by starting the engine 109. Consequently, it is determined that there is made a start demand for the engine 109 when the vehicle speed is higher than a predetermined threshold Vth (a high vehicle speed determination block 53). In this case, too, in order to prevent the frequent occurrence of start and stop of the engine 109, the determination is made based on a threshold having a constant hysteresis width.

Even in the event that none of the conditions described above is met, a fuzzy determination is performed based on a drive mode fitness estimation in relation to fuel consumption and an intention-to-accelerate estimation in relation to a driver's intention to accelerate (a fuzzy determination block 54). When it is determined from the fuzzy determination that the series drive mode is suited better than the EV drive mode, it is determined that there is made a start demand for the engine 109. Hereinafter, the fuzzy determination will be described in detail.

Figure 6:
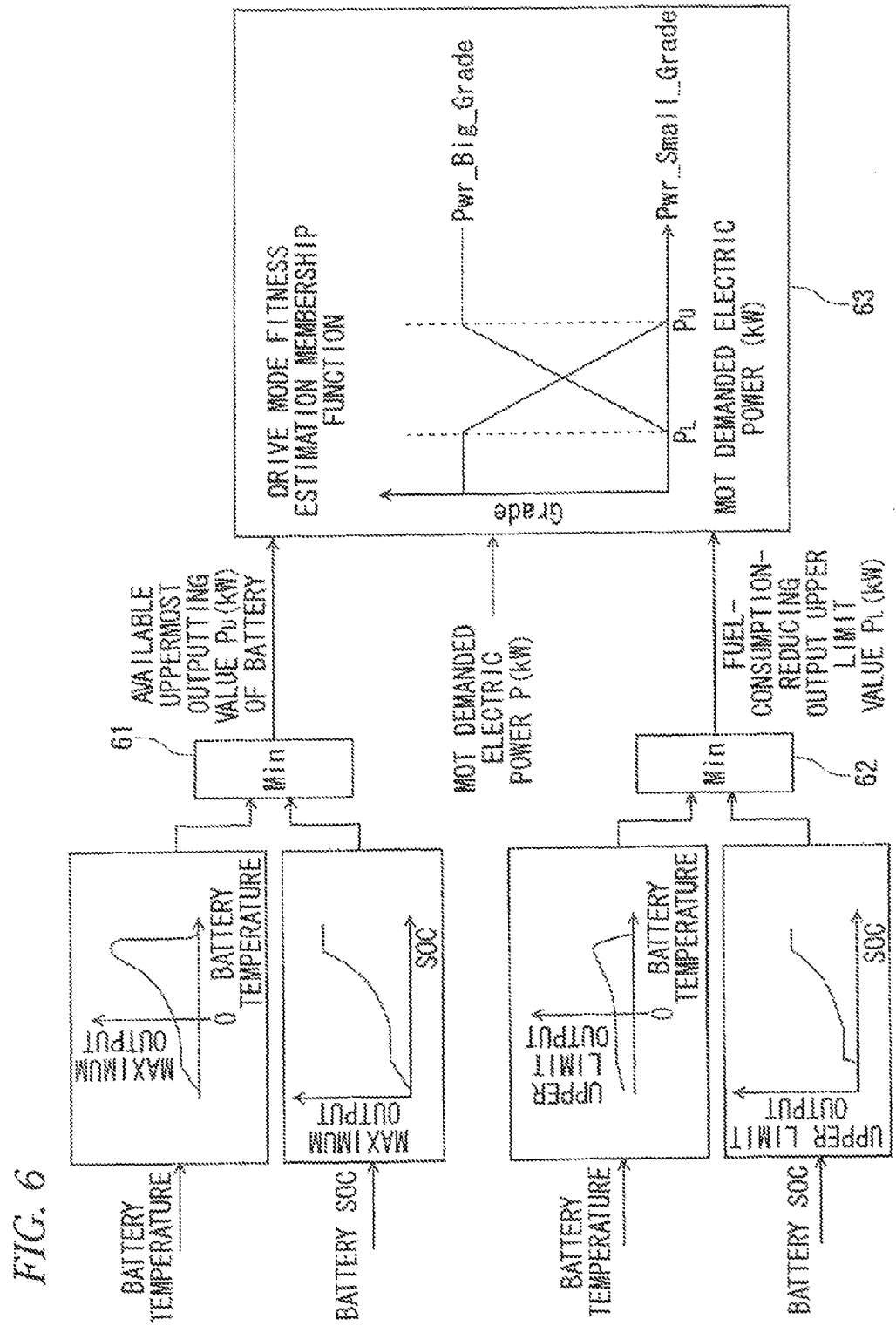
FIG. 6 shows a drive mode fitness estimation.

FIG. 6 shows the drive mode fitness estimation in the fuzzy determination block 54. Firstly, the management ECU 119 sets an available uppermost outputting value $P_U$ of the battery 113 and a fuel-consumption-reducing output upper limit value $P_L$ based the SOC and temperature of the battery 113.

The available uppermost outputting value $P_U$ of the battery 113 is an upper limit value of electric power that the battery 113 can supply and varies according to the SOC and temperature of the battery 113. Consequently, the management ECU 119 calculates maximum electric powers that the battery 113 can supply based on the SOC and temperature of the battery 113, respectively. Then, the management ECU 119 sets a smaller value of the values so calculated as an available uppermost outputting value $P_U$ of the battery 113 (an available uppermost outputting value setting block 61). Data on maximum electric powers that the battery 113 can supply according to the SOC and temperature of the battery 113 are obtained in advance through experiments and are stored in a memory of the like, not shown.

In contrast, the fuel-consumption-reducing output upper limit value $P_L$ is a boundary value between a region where a running in the EV drive mode contributes better to improvement in fuel consumption and a region where a running in the battery input/output zero drive mode contributes better to improvement in fuel consumption. This value is set by the following method.

In the EV drive mode, the vehicle runs by supplying the electric power of the battery 113 to the electric motor 101. As this occurs, a loss is generated when the direct current voltage of the battery 113 is converted into the alternating current voltage in the first inverter 103, and a loss is also generated when the electric motor 101 is driven. In addition, the SOC of the battery 113 is reduced by supplying the electric power of the battery 113. The level of the SOC so reduced here needs to be returned to the original level sometime in the future by generating electric power using the power of the engine 109. A loss is also generated when the generator 107 generates electric power using the power of the engine 109 to return the level of the SOC of the battery 113 to the original level thereof. Consequently, a total loss $L_{EV}$ which is generated in the EV drive mode is a sum of the loss generated when the electric power is supplied from the battery 113 to the electric motor 101, the loss generated when the electric motor 101 is driven, and the loss generated when the generator 107 generates electric power later.

In contrast, in the battery input/output zero mode, the generator 107 generates only electric power corresponding to the demanded electric power by a power of the engine 109, and the electric motor 101 is driven by the electric power so generated, whereby the vehicle runs. Losses are generated respectively when the generator 107 generates electric power by a power of the engine 109 and when the electric motor 101 is driven. Consequently, a total loss $L_{SE}$ generated in the battery output/input zero mode is a sum of the loss generated when the generator 107 generates electric motor and the loss generated when the electric motor 101 is driven.

The management ECU 119 calculates output upper limit values of the battery 113 based on the SOC and temperature of the battery 113, respectively, to such an extent that the total loss $L_{EV}$ generated in the EV drive mode does not surpass the total loss $L_{SE}$ generated in the battery input/output zero mode. The management ECU 119 then sets a smaller value of the output upper limit values so calculated as a fuel-consumption-reducing output upper limit value $P_L$ (a fuel-consumption-reducing output upper limit setting block 62). Data on the upper limit values according to the SOC and temperature of the battery 113 to such an extent that $L_{EV}$ does not surpass the $L_{SE}$ are obtained in advance through experiments and are stored in the memory of the like, not shown.

Figure 7:
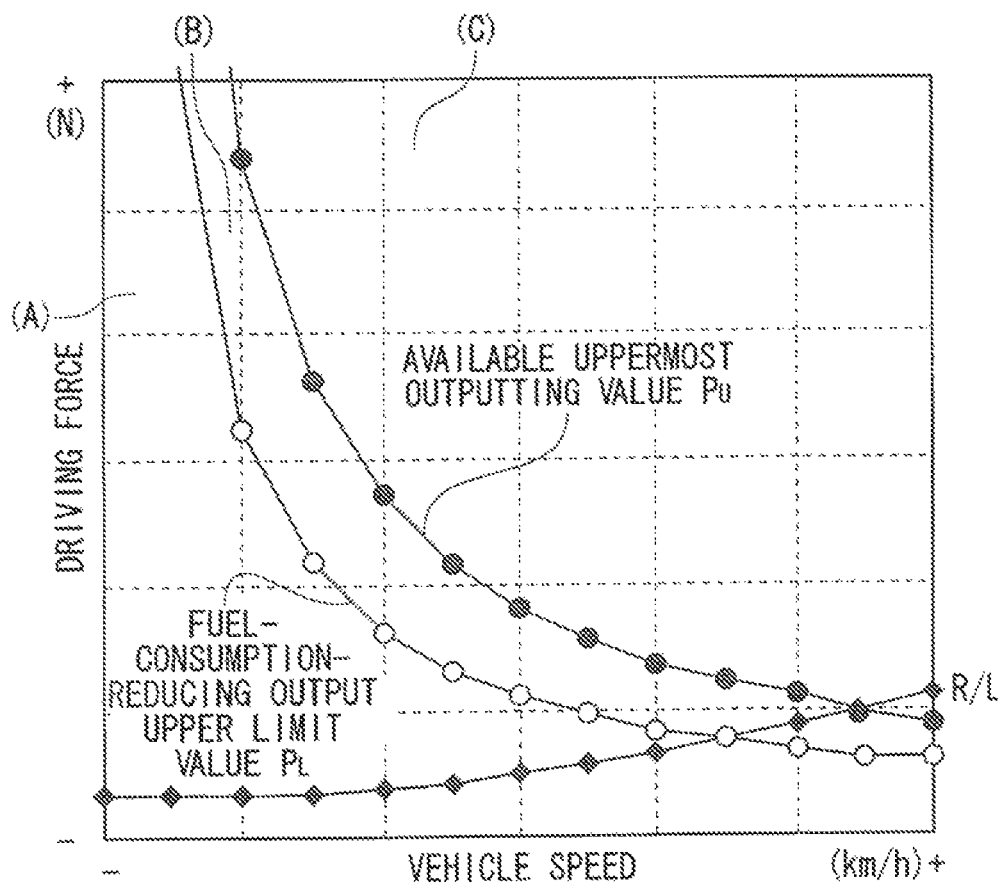
FIG. 7 shows an available uppermost outputting value and a fuel-consumption-reducing output upper limit value.

FIG. 7 shows the available uppermost outputting value $P_U$ and the fuel-consumption-reducing output upper limit value $P_L$. In the figure, an axis of abscissas denotes vehicle speed (km/h) and an axis of ordinates denotes driving force (N). Reference character R/L in the figure denotes a running resistance on the flat ground or road.

Namely, when demanded electric power P>available uppermost outputting value $P_U$, that is, in a region (C) in FIG. 7, the demanded electric power P cannot be supplied by the battery 113 only. Consequently, the vehicle cannot run in the EV drive mode in the region (C), and therefore, the management ECU 119 controls so that the engine 109 is started to thereby enable the vehicle to run in the series drive mode.

When demanded electric power P<fuel-consumption-reducing output upper limit $P_L$, that is, in a region (A) in FIG. 7, the demanded electric power P is not so large, and hence, the consumption of electric power at the battery 113 is also not so large. In addition, the electric power that is to be generated later is also not so large. Consequently, losses generated respectively are also not so large, resulting in $L_{EV}<L_{SE}$. Consequently, in the region (A), it is preferable that the vehicle runs in the EV drive mode from the viewpoint of fuel consumption, and therefore, the management ECU 119 controls so that the vehicle runs in the EV drive mode without starting the engine 109.

When fuel-consumption-reducing output upper limit $P_L$≤demanded electric power P≤available uppermost outputting value $P_U$, namely, in a region (B), since the demanded electric power P does not surpass the available uppermost outputting value $P_U$, the demanded electric power P can be supplied by only the electric power of the battery 113, and therefore, the vehicle can run in the EV drive mode. Since the demanded electric power P is relatively large, however, the consumption of electric power at the battery 113 also becomes relatively large, and additionally, an electric power to be generated later also becomes large, thereby resulting in $L_{EV} \geq L_{SE}$. Because of this, in the region (B), it is desirable that the vehicle runs in the series drive mode from the viewpoint of fuel consumption. However, starting the engine 109 immediately after demanded electric power P≥$P_L$ causes fears that the control is switched frequently. Then, when fuel-consumption-reducing output upper limit $P_L$≤demanded electric power P≤available uppermost outputting value $P_U$, the management ECU 119 performs a fussy reasoning.

Returning to FIG. 6, the management ECU 119 sets a drive mode fitness estimation membership function from the available uppermost outputting value $P_U$ and the fuel-consumption-reducing output upper limit value $P_L$ of the battery 113. Then, a fitness of the drive mode to the current demanded electric power P is calculated from the following language control rules (a drive mode's fitness calculation block 63).

<Language Control Rules>
(1) If MOT demanded electric power is smaller than $P_L$, the series drive mode fitness is high, and
(2) If MOT demanded electric power is larger than $P_U$, the series drive mode fitness is low.

Figure 8:
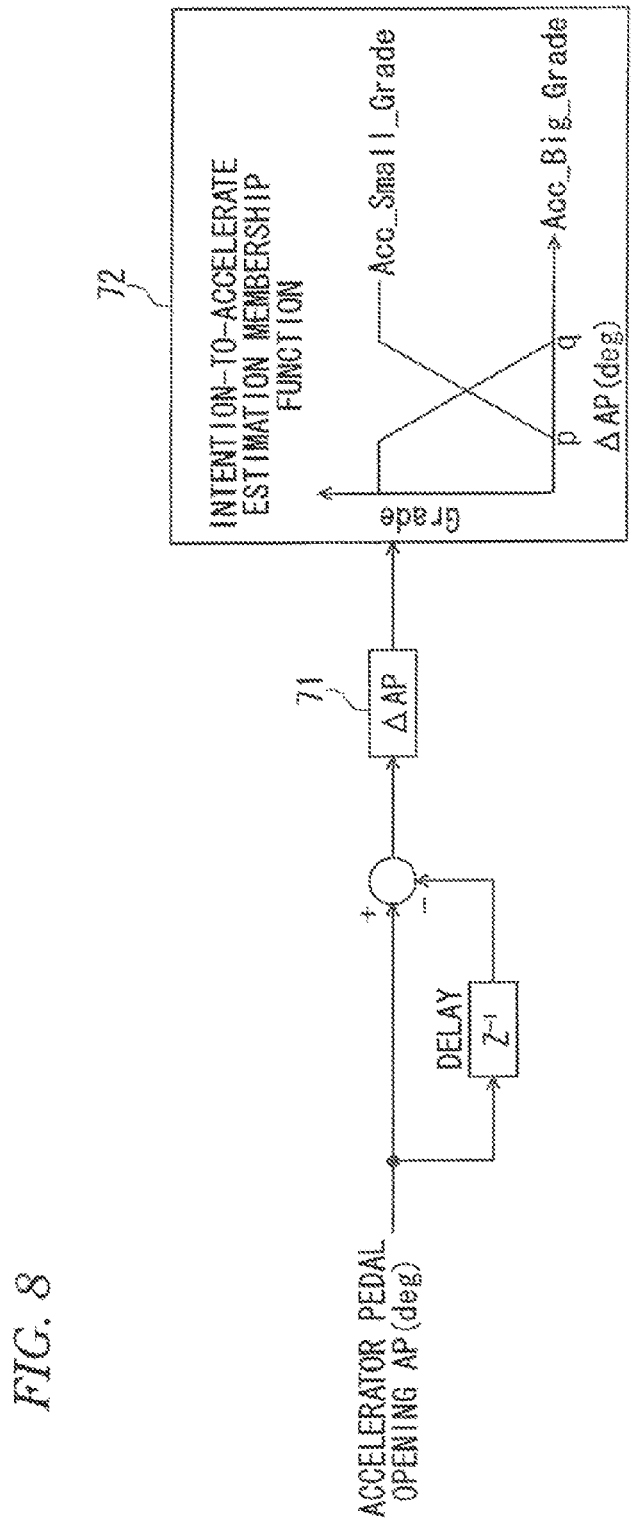
FIG. 8 shows an intention-to-accelerate estimation.

FIG. 8 shows of an intention-to-accelerate estimation in the fuzzy determination block 54. Firstly the management ECU 119 calculates a differential value of an accelerator pedal opening AP. Then, the management ECU 119 calculates an accelerator pedal opening temporal change rate ΔAP (a ΔAP calculation block 71). Then, an intention-to-accelerate estimation value for the current ΔAP is calculated from an intention-to-accelerate estimation membership function regarding a predetermined ΔAP and the following language control rules (an intention-to-accelerate estimation value calculation block 72). Note that values p, q are set as demanded through experiments.

<Language Control Rules>
(1) If ΔAP is smaller than p, the intension to accelerate is small, and
(2) If ΔAP is larger than q, the intension to accelerate is large.

Figure 9:
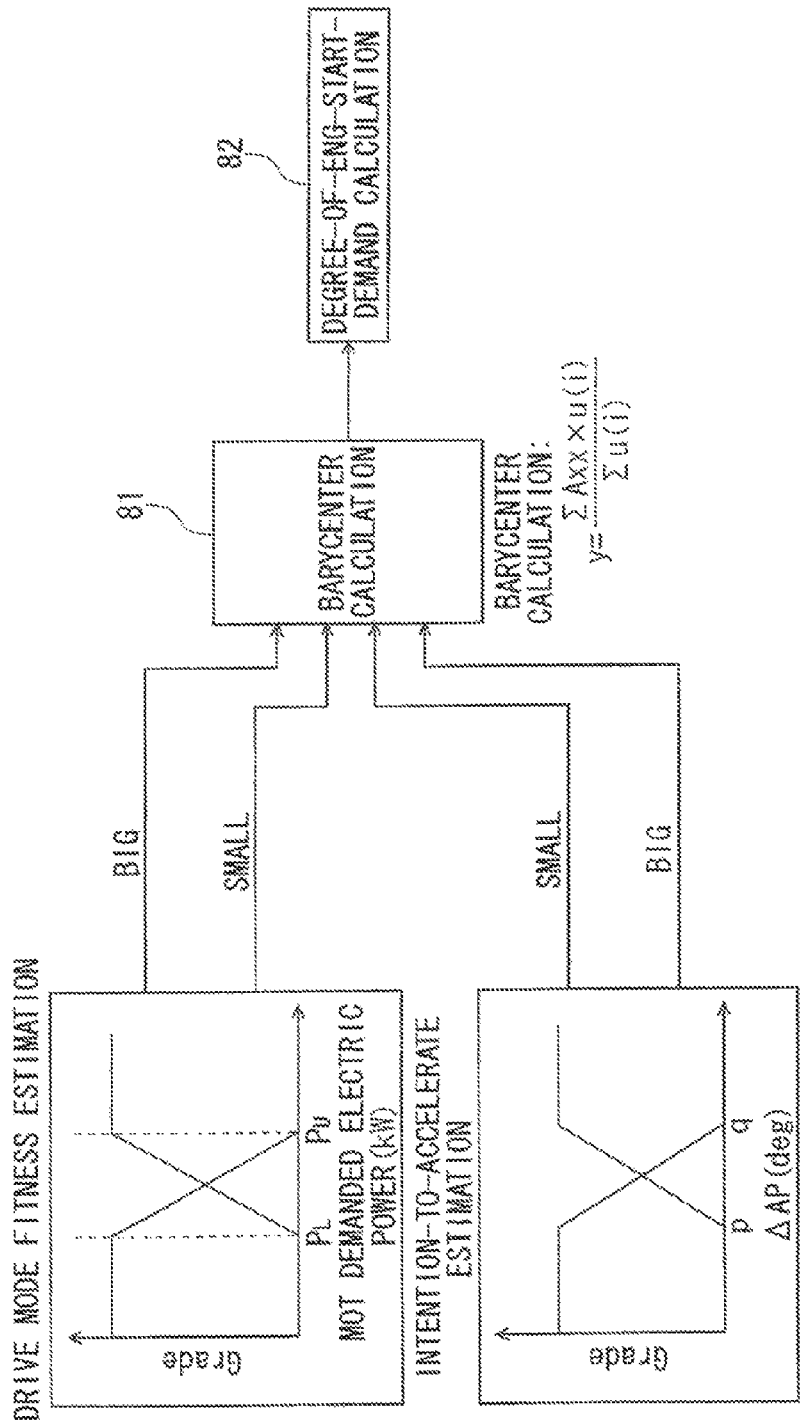
FIG. 9 shows a detailed configuration of a fuzzy determination block shown in FIG. 5.

FIG. 9 shows a calculation of a degree of ENG start demand by the fuzzy determination block 54. The management ECU 119 calculates barycenters of the drive mode fitness and the intension to accelerate estimation value (a barycenter calculation block 81) and calculates a degree of ENG start demand (a degree-of-ENG-start-demand calculation block 82). This degree of ENG start demand has an arbitrary value between −1 to 1.

Returning to FIG. 5, the management ECU 119 integrates the degree of ENG start demand calculated by the fuzzy determination block 54 (an integration block 55). The integration of the degree of ENG start demand is executed so as to obtain a value in the range of 0 to 1. In the event that the integral value so calculated is higher than a predetermined threshold Ith, it is determined that there is made a start demand for the engine 109 (an integral value determination block 56). In this case, too, in order to prevent the frequent occurrence of start and stop of the engine 109, the determination is made based on a threshold having a predetermined hysteresis width. By utilizing the integral value of the degree of ENG start demand, it can be determined that there is made a start demand for the engine 109 only when the fluctuation in demanded electric power or accelerator pedal opening is not temporary but is continuous. Therefore, it is possible to prevent the frequent occurrence of start and stop of the engine 109 in an more ensured fashion.

Figure 10:
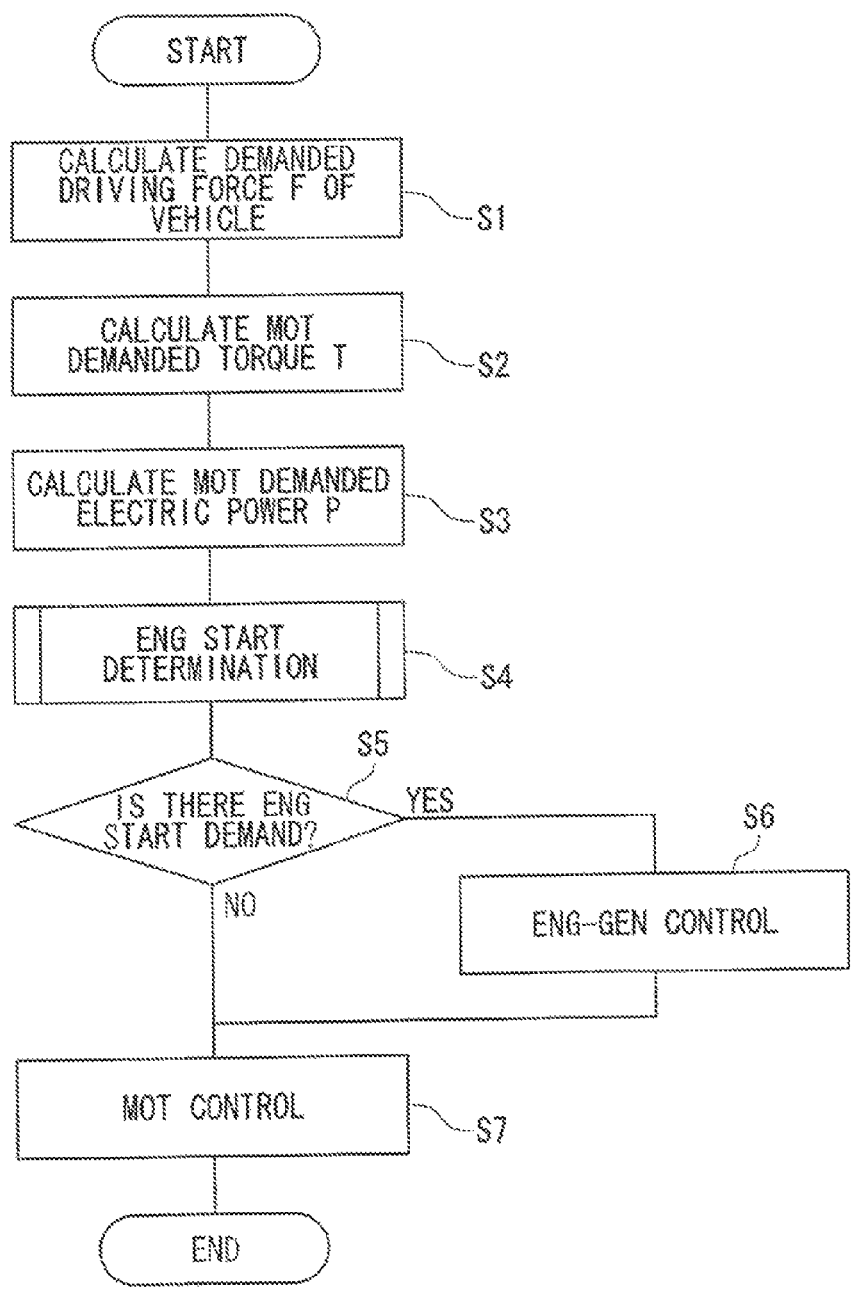
FIG. 10 shows operations of the controller for a hybrid vehicle according to the embodiment.

Hereinafter, the operation of the controller for a hybrid vehicle according to the embodiment will be described in detail. FIG. 10 shows operations of the controller for the hybrid vehicle 1 according to the embodiment. Firstly, the management ECU 119 calculates a demanded driving force F demanded of the electric motor 101 (step S1) and then calculates a demanded torque T demanded of the electric motor 101 (an MOT demanded torque) based on the demanded driving force F (step S2). Following this, the management ECU 119 calculates a demanded electric power P demanded of the electric motor 101 (an MOT demanded electric power) based on the MOT demanded torque T, the MOT revolution speed and the VCU output voltage (step S3). The management ECU 119 makes, based on this MOT demanded electric power P, a determination on whether or not the engine 109 is started (an ENG start determination) (step S4).

Figure 11:
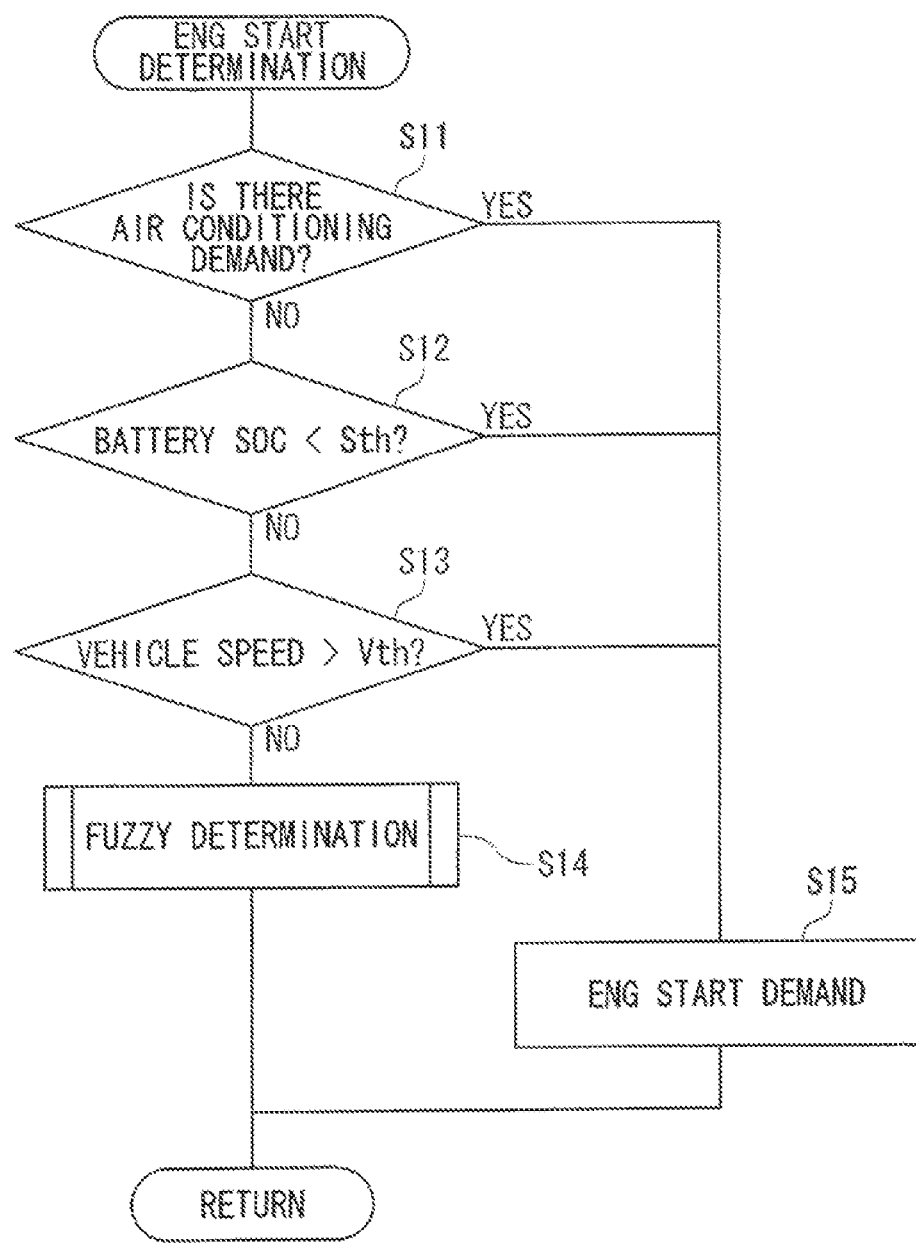
FIG. 11 shows operations of an engine starting determination.

FIG. 11 shows operations of the ENG start determination. In determining whether or not the engine 109 is started, the management ECU 119 determines whether or not there is made an air conditioning demand such as a demand for cooling or heating the passenger compartment (step S11). If it determines that there is made no air conditioning demand, the management ECU 119 determines whether or not the SOC of the battery 113 (the battery SOC) is lower than the predetermined threshold Sth (step S12).

If it determines in step S17 that the battery SOC≥Sth, the management ECU 119 determines whether or not the vehicle speed is higher than the predetermined threshold Vth (step S13). In order to prevent the frequent occurrence of switching in control, these thresholds Sth, Vth are set so as to have predetermined hysteresis widths. If the vehicle speed≤Vth, the management ECU 119 executes a fuzzy determination (step S14).

If it determines in step S11 that there is made an air conditioning demand, if it determines in step S12 that the battery SOC<Sth, or if it determines in step S13 that the vehicle speed>Vth, understanding that there is an ENG start demand, the management ECU 119 executes the following operation (step S15).

Figure 12:
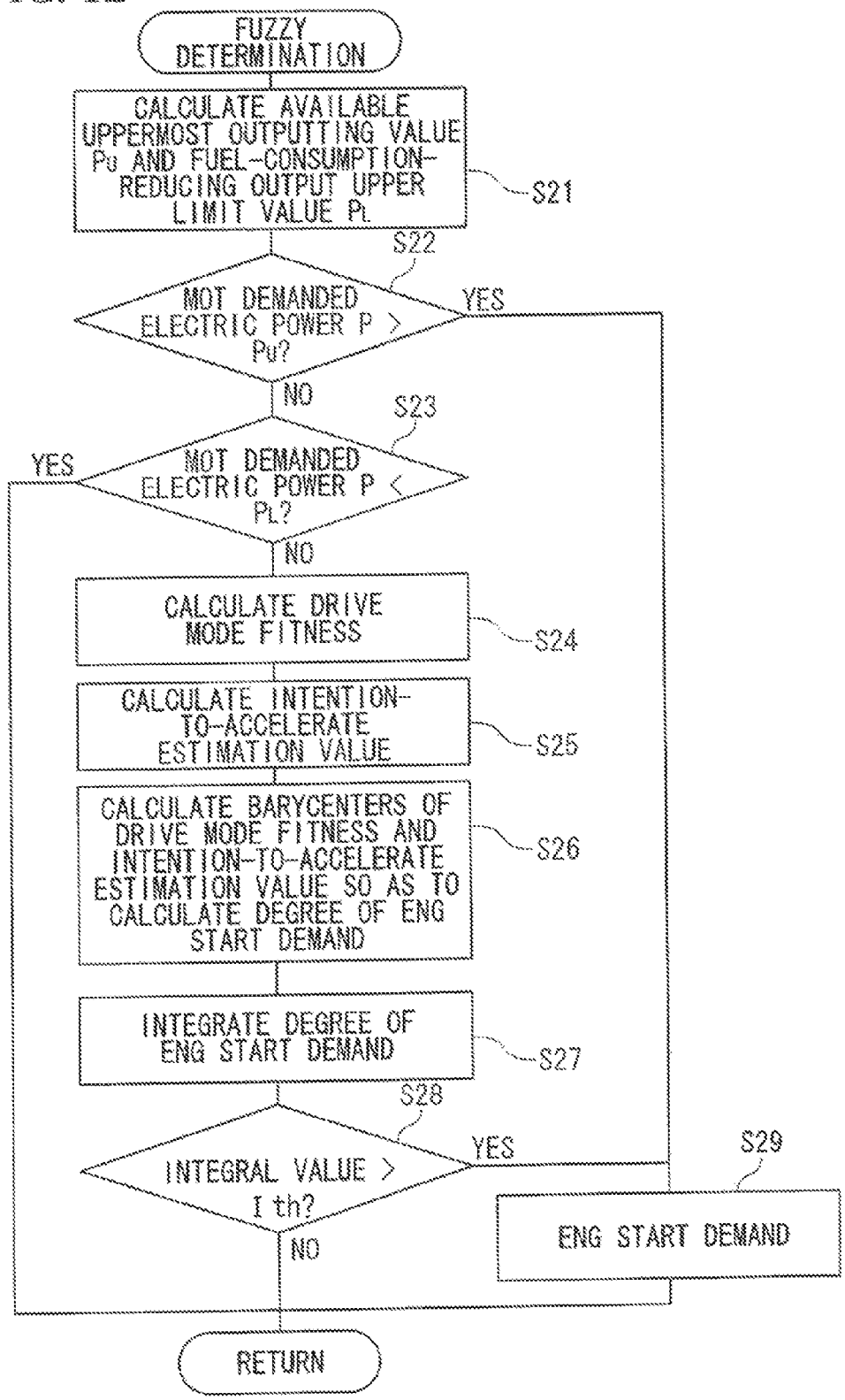
FIG. 12 shows operations of a fuzzy determination.

FIG. 12 shows operations of the fuzzy determination which is executed during the ENG start determination. Firstly, the management ECU 119 calculates an available uppermost outputting value $P_U$ and a fuel consumption-reducing output upper limit value $P_L$ based on the SOC and temperature of the battery 113 (step S21). Then, the management ECU 119 determines whether or not the demanded electric power P demanded of the electric motor 101 is larger than the available uppermost outputting value $P_U$ (step S22). If it determines that the demanded electric power P demanded of the electric motor 101≥$P_U$, the management ECU 119 determines whether or not the MOT demanded electric power P is smaller than the fuel-consumption-reducing output upper limit value $P_L$ (step S23). If it determines in step S23 that the demanded electric power P demanded of the electric motor 101≤fuel-consumption-reducing output upper limit value $P_L$, understanding that there is made no ENG start demand, the management ECU 119 ends the fuzzy determination.

If it determines in step S23 that the demanded electric power P demanded of the electric motor 101≥the fuel-consumption-reducing output upper limit value $P_L$, that is, the fuel-consumption-reducing output upper limit $P_L$≤the MOT demanded electric power P≤the available uppermost outputting value $P_U$, the management ECU 119 sets a drive mode fitness estimation membership function from the Fuel-consumption-reducing output upper limit $P_L$ and the available uppermost outputting value $P_U$. Then, the management ECU 119 executes a fuzzy reasoning based on the drive mode fitness estimation membership function and the current demanded electric power P demanded of the electric motor 101 so as to calculates a fitness of the drive mode to the current demanded electric power P demanded of the electric motor 101 (step S24).

Next, the management ECU 119 executes a fuzzy reasoning based on the intention-to-accelerate estimation membership function in relation to the accelerator pedal opening temporal change rate ΔAP and the current ΔAP is calculated from so as to calculate an intention-to-accelerate estimation value for the current ΔAP (step S25). Then, the management ECU 119 calculates barycenters of the drive mode fitness and the intension to accelerate estimation value so as to calculate a degree of ENG start demand (step S26).

Next, the management ECU 119 integrates the degree of ENG start demand (step S27). Then, the management ECU 119 determines whether or not the integral value of the degree of ENG start demand is equal to or larger than a predetermined threshold Ith. In order to prevent the frequent occurrence of switching in control, the threshold Ith is set so as to have a predetermined hysteresis width. If it determines in step S27 that the integral value<Ith, understanding that there is made no ENG start demand, the management ECU 119 ends the fuzzy determination. If it determines in step S22 that the demanded electric power P demanded of the electric motor 101>$P_U$, or if it determines in step S28 that the integral value≥Ith, understanding that there is made an ENG start demand, the management ECU 119 executes the next operation.

Returning to FIG. 10, the management ECU 119 determines based on the ENG start determination in step S4 whether or not there has been made an ENG start demand (step S5). If it determines in step S5 that there has been made no ENG start demand, the management ECU 119 controls the electric motor 101 based on the demanded torque T so as to cause the vehicle to run in the EV drive mode without starting the engine 109 (step S7). In contrast, if it determines in step S5 that there has been made an ENG start demand, the management ECU 119 controls the engine 109 and the generator 107 so as to cause the vehicle to run in the series drive mode by starting the engine 109 (step S6). At the same time, the management ECU 119 controls the electric motor 101 based on the demanded torque T (step S7).

Thus, according to the controller for a hybrid vehicle of this embodiment, the engine 109 is started when the available uppermost outputting value $P_U$ which is set according to the conditions of the battery 113 surpasses the demanded electric power of the electric motor 101, and therefore, not only can the desired demanded electric power be ensured, but also the over charge of the battery 113 can be prevented. Additionally, the fuel-consumption-reducing output upper limit value $P_L$ is set which is the maximum value of the demanded electric power with which the fuel consumption resulting when the vehicle runs in the EV drive mode is improved better than the fuel consumption resulting when the vehicle runs in the battery input/output zero mode, and it is determined based on the fuel-consumption-reducing output upper limit value $P_L$ whether or not the engine 109 is started. Therefore, the fuel consumption can be improved further. In addition, the fuel-consumption-reducing output upper limit value $P_L$ is set based on the conditions of the battery 113 in consideration of the fact that the outputting electric power is reduced depending upon the SOC and temperature of the battery 113, and therefore, the over charge of the battery 113 can be prevented.

Additionally, according to the controller for a hybrid vehicle of the embodiment, when the demanded electric power demanded of the electric motor 101 is somewhere between the fuel consumption-reducing output upper limit value $P_L$ and the available uppermost outputting value $P_U$, the fuzzy reasoning is executed based on the demanded electric power demanded of the electric motor 101 and the driver's intention to accelerate, whereby it is determined based on the results of the fuzzy reasoning whether or not the engine 109 is started. This not only can eliminate fears that the lack of driving force is caused by the insufficient output of the battery 113 but also can prevent the electric motor 101 from performing unnecessary operations of the engine 109. Additionally, the continuity of the running condition of the vehicle can be determined by integrating the degree of ENG start demand, and therefore, the unnecessary operation of the engine 109 is obviated. By so doing, a more accurate control reflecting the intention of the driver can be executed.

FIRST MODIFIED EXAMPLE

In the embodiment, the management ECU 119 set the drive mode fitness estimation membership function based on the SOC and temperature of the battery 113. However, the drive mode fitness estimation membership function can be corrected based on the temperature of the coolant of the engine 109 or the consumed electric power of the auxiliary 117.

For example, when the temperature of the coolant of the engine 109 is low, it is highly possible that the warming up of the engine 109 needs to be promoted, and therefore, it is desirable that the vehicle runs in the series drive mode by starting the engine 109 earlier. Consequently, when the temperature of the coolant of the engine 109 is low, the drive mode fitness estimation membership function is corrected so that a high fitness to the series running tends to be calculated easily. When the temperature of the coolant of the engine 109 is lower than a predetermined value, this correction is implemented by utilizing an arbitrary method such as a method of subtracting a predetermined value from the fuel-consumption-reducing output upper limit value $P_L$ or a method of subtracting a value corresponding to the temperature of the coolant of the engine 109 from the fuel-consumption-reducing output upper limit value $P_L$. By correcting the drive mode fitness estimation membership function in this way, it becomes easy to make a determination that there is made a demand for starting the engine 109 when the temperature of the coolant of the engine 109 is low.

Additionally, when the temperature of the coolant of the engine 109 is high, it is highly possible that the engine 109 needs to be inoperative so as to reduce the temperature of the coolant, and therefore, it is desirable that the vehicle runs in the EV drive mode without starting the engine 109. Consequently, when the temperature of the coolant of the engine 109 is high, the drive mode fitness estimation membership function is corrected so that a low fitness to the series running tends to be calculated easily. When the temperature of the coolant of the engine 109 is higher than a predetermined value, this correction is implemented by utilizing an arbitrary method such as a method of adding a predetermined value to the fuel-consumption-reducing output upper limit value $P_L$ or a method of adding a value corresponding to the temperature of the coolant of the engine 109 to the fuel-consumption-reducing output upper limit value $P_L$. By correcting the drive mode fitness estimation membership function in this way, it becomes difficult to make a determination that there is made a demand for starting the engine 109 when the temperature of the coolant of the engine 109 is high, so that it becomes easy to continue the EV drive mode.

Additionally, when the consumed electric power by the auxiliary 117 is large, it is preferable to start the engine 109 earlier so as to charge the battery 113. Consequently, when the consumed electric power by the auxiliary 117 is large, the drive mode fitness estimation membership function is corrected so that a high fitness to the series drive mode is calculated. When the consumed electric power by the auxiliary 117 is lower than a predetermined value, this correction is implemented by utilizing an arbitrary method such as a method of subtracting a predetermined value from the fuel-consumption-reducing output upper limit value $P_L$ or a method of subtracting a value corresponding to the consumed electric power of the auxiliary 117 from the fuel-consumption-reducing output upper limit value $P_L$. By so doing, the drive mode fitness estimation membership function is corrected, so that it becomes easy that the high degree of ENG start demand is calculated. Therefore, the engine 109 can be started earlier to generate electric power, thereby making it possible to ensure the demanded electric power.

SECOND MODIFIED EXAMPLE

In the embodiment described above, the management ECU 119 sets the intention-to-accelerate estimation membership function based on the accelerator pedal opening temporal change rate $\Delta AP$. However, the intention-to-accelerate estimation membership function can be corrected based on the eco-switch by which priority is given to fuel consumption or setting of a gearshift range.

For example, when the eco-switch is on, it is determined that the driver desires a running in which priority is given to fuel consumption, and therefore, it is preferable that the vehicle runs in the EV drive mode without starting the engine 109. Consequently, when it is determined that the driver is determined to desire the running in which priority is given to fuel consumption, the intention-to-accelerate estimation membership function is corrected positively so that the sensitivity of the intention-to-accelerate determination is decreased.

In addition, when the gearshift range is set to a sports mode, it is determined that the driver desires a running in which priority is given to acceleration. Therefore, it is desirable that the vehicle runs in the series drive mode by starting the engine 109 earlier. Consequently, when it is determined that the driver desires the running in which priority is given to acceleration, the intention-to-accelerate estimation membership function is corrected negatively so that the sensitivity of the intention-to-accelerate determination is increased. By correcting the intention-to-accelerate estimation membership function in this way, the driveability can be improved by taking the intention of the driver into consideration. Additionally, the fuel consumption can be improved further.

THIRD MODIFIED EXAMPLE

In the embodiment described above, depending upon the running conditions of the vehicle, there may be a situation in which the loss becomes smaller when the vehicle runs in the engine drive mode in which the drive wheels DW, DW are directly driven by the engine 109 than when the vehicle runs in the series drive mode. In this case, the management ECU 119 engages the clutch 115 so as to switch the drive mode from the series drive mode to the engine drive mode, whereby the vehicle can be driven with good efficiency.

In the engine drive mode, the engine 109 is connected to the drive shafts of the drive wheels DW, DW by engaging the clutch 115. When the engine 109 is connected to the drive wheels DW, DW, the engine 109 cannot be run at an operation point which provides good fuel consumption due to the limit to setting of the gear ratio, generating the loss. In addition, a mechanical loss is also generated.

On the other hand, in the battery input/output zero mode, although the engine 109 can be run at an operation point which good fuel consumption, an electrical loss is generated somewhere along the simply line of supplying the electric power generated by the generator 107 to the electric motor 101 via the second inverter 105 and the first inverter 103.

Then, in the third modified example, a total loss that would be generated in the engine drive mode and a total loss that would be generated in the battery input/output zero mode are obtained in advance through experiments. Then, when the total loss generated in the engine drive mode becomes smaller than the total loss generated in the battery input/output zero mode, that is, when it is determined that the fuel consumption becomes better when the vehicle runs in the engine drive mode than when the vehicle runs in the series drive mode, the management ECU 119 engages the clutch 115, so that the vehicle runs in the engine drive mode. By so doing, the drive mode can quickly be shifted from the series drive mode to the engine drive mode, and therefore, the fuel consumption can be improved further.

Note that the invention is not limited to the embodiment but can be modified or improved as required.

DESCRIPTION OF REFERENCE NUMERALS AND SIGNS

101 Electric motor (MOT); 107 Generator (GEN); 109 Multi-cylinder internal combustion engine (ENG); 113 Battery (BATT); 115 Lockup clutch; 117 Auxiliary (ACCESSORY); 119 Management ECU (MG ECU)

The invention claimed is:

1. A controller for a hybrid vehicle,
the vehicle including
an engine,
an electric motor,
a generator for generating electric power by power of the engine, and
a battery for storing electric power generated by the electric motor or the generator and supplying the electric power to the electric motor,
the vehicle being able to run in
an EV drive mode in which the electric motor is driven by electric power of the battery only and
a series drive mode in which the electric motor is driven by electric power generated by the generator using power of the engine,
the controller including
a demanded driving force calculation controller configured to calculate a demanded driving force for the electric motor based on vehicle speed and accelerator pedal opening,
a demanded electric power calculation controller configured to calculate a demanded electric power based on the demanded driving force and a revolution speed of the electric motor,
an available uppermost outputting value setting controller configured to set an available uppermost outputting value for the battery based on the conditions (SOC+ temperature) of the battery, and
a degree-of-start-demand calculation controller configured to calculate a degree of start demand for the engine based on the conditions (SOC +temperature) of the battery, the demanded electric power and the accelerator pedal opening,
an engine starting determination controller configured to determine on the starting of the engine based on the degree of start demand,
wherein the engine starting determination controller is configured to start the engine so that the vehicle runs in the series drive mode, when an integral value obtained by integrating the degree of start demand surpasses a predetermined value.

2. The controller of claim 1, further including
a set value setting controller configured to set a set value based on the conditions (SOC +temperature) of the battery,
a first fitness calculation controller configured to calculate a first fitness between the available uppermost outputting value and the set value by executing a fuzzy reasoning from a first membership function which is set with respect to demanded electric power and the set value, and
a second fitness calculation controller configured to calculate a second fitness based on variation in the accelerator pedal opening,
wherein the degree-of-start-demand calculation controller is configured to calculate the degree of start demand for the engine based on the first fitness and the second fitness.

3. The controller of claim 2,
wherein the first membership function is corrected in accordance with the temperature of a coolant of the engine.

4. The controller of claim 2,
wherein the first membership function is corrected in accordance with energy which is consumed by an auxiliary.

5. The controller of claim 2,
wherein the second fitness calculation controller is configured to calculate the second fitness by executing a fuzzy reasoning from the second membership function which is set with respect to the variation in the accelerator pedal opening
the controller further including
an intention-to-accelerate determination controller configured to determine on a driver's intention to accelerate,
wherein the second membership function is positively corrected when the intention to-accelerate determination controller determines that the driver's intention to accelerate is high, whereas the second membership function is corrected negatively when the intention-to-accelerate determination controller determines that the driver's intention to accelerate is low.

6. The controller of claim 2,
wherein the available uppermost outputting value and the set value are set based on the state-of-charge of the battery or the temperature of the battery.

7. The controller of claim 2,
wherein the available uppermost outputting value and the set value are set based on a smaller value of values which are calculated based on the state-of-charge of the battery and the temperature of the battery.

8. The controller of claim 2,
wherein the available uppermost outputting value and the set value are set smaller as the state-of-charge of the battery becomes smaller.

9. The controller of claim 2,
wherein the available uppermost outputting value and the set value are set smaller as the temperature of the battery becomes smaller.

10. The controller of claim 2,
wherein the engine starting determination controller is configured to start the engine so that the vehicle runs in the series drive mode, when the demanded electric power exceeds the available uppermost outputting value.

11. The controller of claim 2,
wherein the vehicle can run in an engine drive mode in which drive wheels are driven by power of the engine by engaging a clutch which is provided between the engine and the electric motor, wherein the controller further includes a clutch engaging/disengaging controller configured to engage and disengage the clutch, and wherein the clutch engaging/disengaging controller is configured to engage the clutch to change the drive modes from the series drive mode to the engine drive mode when a loss generated in the series drive mode is larger than a loss generated in the engine drive mode.

\* \* \* \* \*